U S 010246271 B 2

United States Patent
Heger et al.

(10) Patent No.: US 10,246,271 B2
(45) Date of Patent: Apr. 2, 2019

(54) METHOD AND PALLET STOPPER FOR STOPPING A DISCRETE PRODUCT

(71) Applicant: Weforma Daempfungstechnik GmbH, Stolberg (DE)

(72) Inventors: Axel Heger, Stolberg (DE); Armin Schmidt, Stolberg (DE)

(73) Assignee: Weforma Daempfungstechnik GmbH, Stolberg (DE)

( * ) Notice: Subject to any disclaimer, the term of this patent is extended or adjusted under 35 U.S.C. 154(b) by 0 days.

(21) Appl. No.: 15/947,740

(22) Filed: Apr. 6, 2018

(65) Prior Publication Data

US 2018/0290839 A1 Oct. 11, 2018

(30) Foreign Application Priority Data

Apr. 6, 2017 (EP) .................................... 17165285

(51) Int. Cl.
B65G 47/88 (2006.01)

(52) U.S. Cl.
CPC ...... B65G 47/8823 (2013.01); *B65G 2205/04* (2013.01); *B65G 2205/06* (2013.01)

(58) Field of Classification Search
CPC .... B65G 13/075; B65G 47/29; B65G 47/295; B65G 47/8807; B65G 47/8815; B65G 47/8823; B65G 2205/04; B65G 2205/06; B23Q 16/008
See application file for complete search history.

(56) References Cited

U.S. PATENT DOCUMENTS

| 5,199,537 A * | 4/1993 | Worner | B23Q 16/008 |
| | | | 188/266 |
| 5,676,235 A * | 10/1997 | Sam | B23Q 7/1426 |
| | | | 193/35 A |
| 5,860,505 A * | 1/1999 | Metzger | B65G 47/8823 |
| | | | 198/345.1 |
| 7,232,025 B1 * | 6/2007 | Warren | B65G 47/8823 |
| | | | 193/35 A |
| 7,484,615 B2 * | 2/2009 | Miyamoto | B65G 47/8815 |
| | | | 193/35 A |
| 7,559,419 B2 * | 7/2009 | Unterhuber | B65G 47/8823 |
| | | | 193/35 A |

(Continued)

FOREIGN PATENT DOCUMENTS

DE 4236534 A1 5/1994
DE 102007024300 A1 12/2008
(Continued)

*Primary Examiner* — Gene O Crawford
*Assistant Examiner* — Keith R Campbell

(57) ABSTRACT

A method for stopping a discrete product that is fed by a continuous conveyor along a feed path in a feed direction to a stop location, the method including the steps: initially moving a stop at the stop location from a reset position outside of the feed path into the feed path so that the discrete product contacts the stop and moves the stop in the feed direction by a damping length wherein an impulse of the discrete product is dissipated by a fluid flowing through a throttle element; subsequently removing the stop from the feed path and moving the stop by the damping length against the feed direction back into the reset position; and pivoting the stop from the reset position into the feed path and pivoting the stop from the feed path into the reset position about the feed direction.

10 Claims, 5 Drawing Sheets

(56) References Cited

U.S. PATENT DOCUMENTS 7,565,960 B2 *   7/2009   Worner .............. B65G 47/8815
                                                    198/459.6
7,938,246 B2 *   5/2011   Lindemann ........ B65G 47/8823
                                                    193/35 A

FOREIGN PATENT DOCUMENTS

DE   102013015525 A1   3/2015
EP        1522383 A2   4/2005
FR         856998 A1   5/2004

* cited by examiner

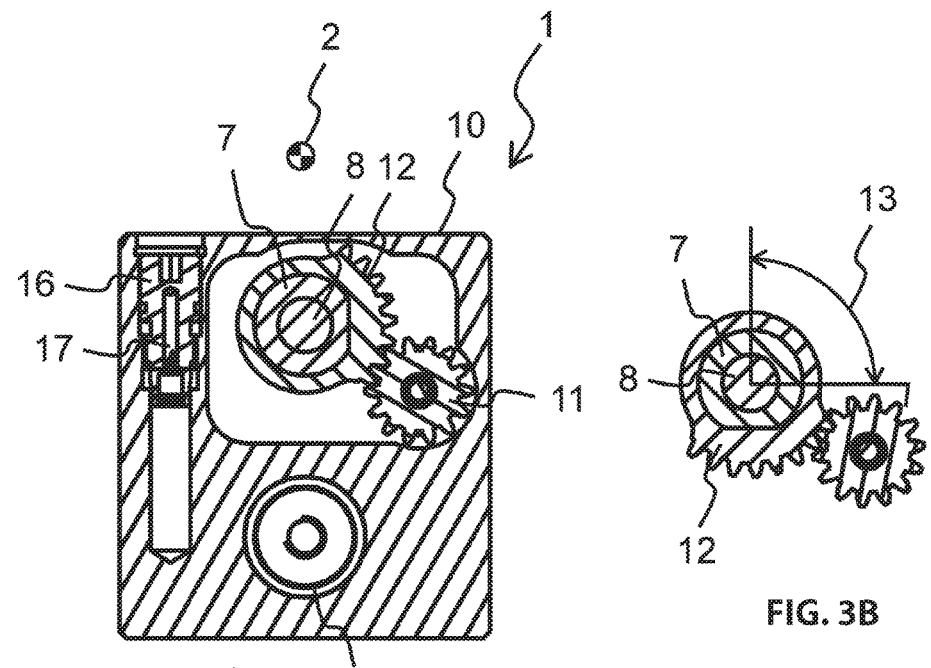
FIG. 3A
FIG. 3B
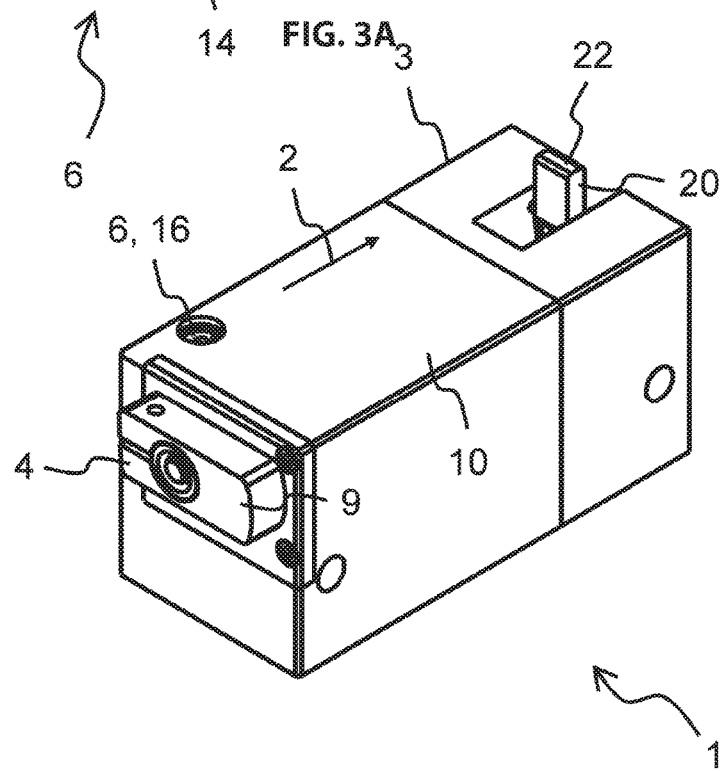
FIG. 4

METHOD AND PALLET STOPPER FOR STOPPING A DISCRETE PRODUCT

RELATED APPLICATIONS

This application claims priority from and incorporates by reference European Patent Application EP 17 165 285.2 filed on Apr. 6, 2017.

FIELD OF THE INVENTION

The invention relates to a method for stopping a discrete product that is fed by a continuous conveyor along a feed path in a feed direction to a stop location. The invention furthermore relates to a pallet stopper for performing the method.

BACKGROUND OF THE INVENTION

A generic method and a corresponding pallet stopper are known from DE 10 2007 024 30 A1, wherein the stop is moved by a transversal drive transversal to the feed direction from the reset position into the feed path and back. The housing of the known pallet stopper envelops the stop in both positions and has a corresponding installed height.

BRIEF SUMMARY OF THE INVENTION

It is an object of the invention to reduce an installed height of the pallet stopper.

Improving the known method it is proposed according to the invention to pivot the stop from the reset position into the feed path and to pivot the stop from the feed path into the reset position about the feed direction. The pallet stopper according to the invention has an installed height compared to the known pallet stopper that is reduced by a difference between a height in the reset position and a height in the position in the feed path.

The object is achieved by a method for stopping a discrete product that is fed by a continuous conveyor along a feed path in a feed direction to a stop location, the method including the steps: initially moving a stop at the stop location from a reset position outside of the feed path into the feed path so that the discrete product contacts the stop and moves the stop in the feed direction by a damping length wherein an impulse of the discrete product is dissipated by a fluid flowing through a throttle element; subsequently removing the stop from the feed path and moving the stop by the damping length against the feed direction back into the reset position; and pivoting the stop from the reset position into the feed path and pivoting the stop from the feed path into the reset position about the feed direction.

The object is also achieved by a pallet stopper for stopping a discrete product at stop location of a feed path along which the discrete product is fed by a continuous conveyor in a feed direction, the pallet stopper including a stop; a drive by which the stop is movable from a reset position outside of the feed path into the feed path and removable from the feed path; a throttle element wherein an impulse of the discrete product that impacts the stop and displaces the stop in the feed direction by a damping length is dissipated by a fluid flowing through a throttle element; and a reset drive by which the stop is movable about the damping length against the feed direction back into the reset position, wherein the stop is pivotable by the drive about the feed direction.

Advantageously the stop is pivoted in one rotation direction from the reset position into the feed path and in an opposite rotation direction from the feed path into the reset position about the feed direction according to the method according to the invention. Thus, the housing does not have to provide additional space for the movement in the opposite rotation direction.

Advantageously the stop is pivoted according to the method according to the invention about a defined pivot angle of the reset back into the feed path. Thus the housing does not have to provide additional space for movements with a greater pivot angle.

Advantageously the stop is moved back about the damping length after being removed from the feed path when the discrete product runs over the stop location. Thus, the pallet stopper does not require an additional drive for resetting.

Alternatively the stop or the housing can include a spiral about the longitudinal axis of the stop so that the reset drive simultaneously causes a rotation movement of the stop. In this case the reset by the discrete product is omitted.

Improving the known pallet stopper it is proposed according to the invention that the stop is pivotable by the drive about the feed direction. The pallet stopper according to the invention facilitates performing the method described supra and is also characterized by the advantages recited therein.

Advantageously the drive for the pallet stopper according to the invention is an electric motor. Electric motors are available in many variants at low cost. Alternatively the stop can also be pivoted by an electromagnet or a pneumatic or hydraulic drive.

Advantageously the damping element in a pallet stopper according to the invention includes a piston that is movable in a damping cylinder that is filled with a fluid. Pneumatic of hydraulic pistons of this type are well known and proven in the art.

Alternatively an electro-rheological damping element or an elastomeric material can be used.

Advantageously the piston is mechanically connected with the pallet stopper according to the invention so that the piston is moved against the feed direction when the stop is moved in the feed direction. By reversing the movement direction, for example by a mechanical lever, the damping element can be arranged adjacent to the stop, in particular below the stop.

Advantageously the stop in the pallet stopper according to the invention is made from steel. Further advantageously the reset drive in the pallet stopper according to the invention includes a reset stop that is actuated by the discrete product that runs over the stop location. Further advantageously the reset stop is made from steel and the pallet stopper includes an elastomeric material element that limits a movement of the reset stop against the feed direction. When the pallet stopper is contacted by the discrete product against the feed direction due to operator error the discrete product can run over the reset stop without damaging it.

Alternatively the stop or the reset stop can be pivotably supported against the feed direction and can be for example spring loaded in order to respectively achieve the same goal. In this pallet stopper according to the invention the stop is protected against being damaged.

In another alternative the reset is performed by a slotted element drive, by a slant, in a linear manner or in a longitudinal groove. In a pallet stopper of this type according to the invention no reset stop is required.

Advantageously a pallet stopper according to the invention includes at least one inductive or capacitive sensor to determine the position of the stop in the feed direction and/or the pivot position of the stop in order to determine a position of the stop.

BRIEF DESCRIPTION OF THE DRAWINGS

The invention is subsequently described based on an embodiment with reference to a drawing figure, wherein:

FIG. 3A illustrates a sectional view of the first pallet stopper;

FIG. 3B illustrates a detail of the sectional view of FIG. 3A;

FIG. 4 illustrates the first pallet stopper in an intermediary position (release of the pallet);

DETAILED DESCRIPTION OF THE INVENTION

Figure 1A:
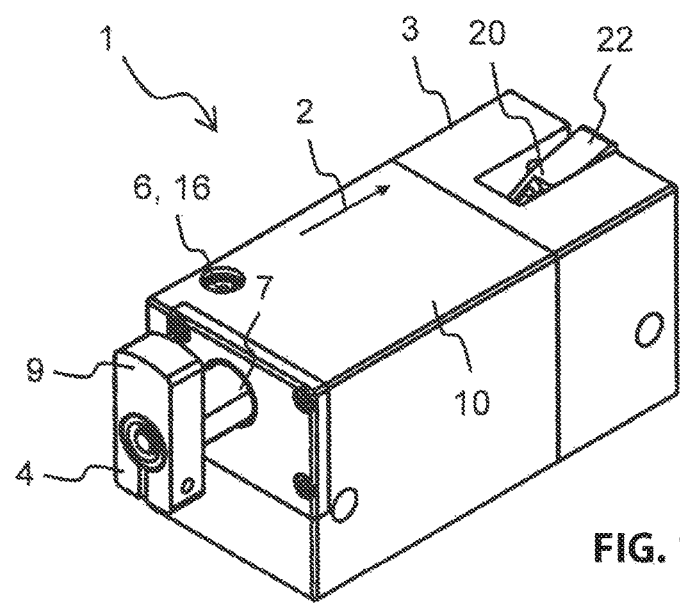
FIG. 1A/B illustrates a first pallet stopper according to the invention in a starting position.
Figure 1B:
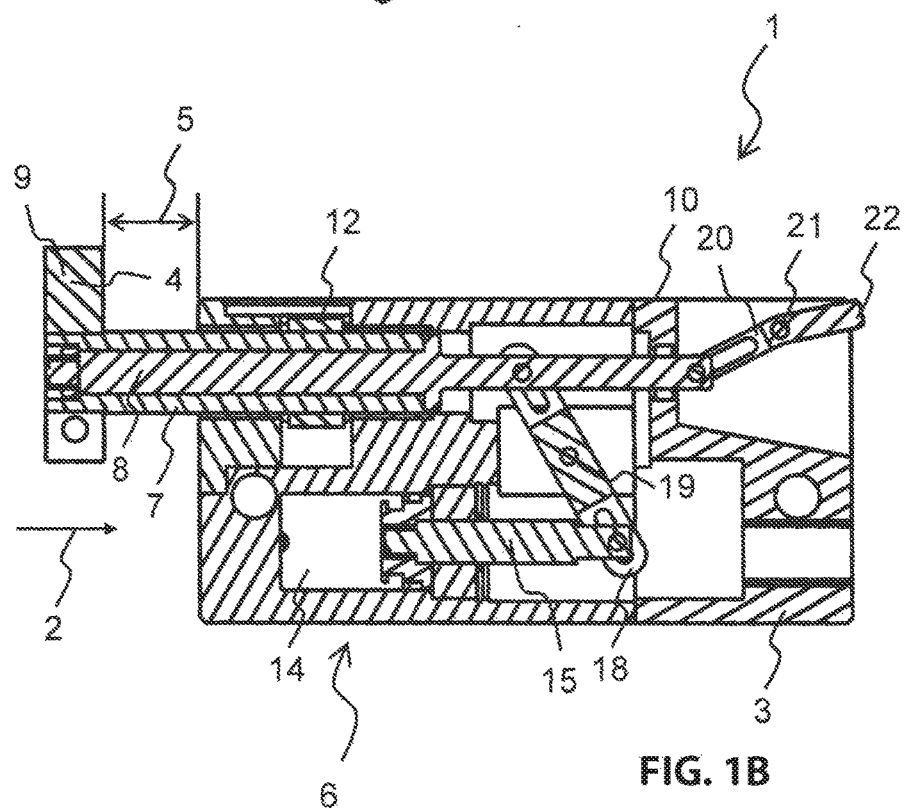

The first pallet stopper 1 according to the invention illustrated in FIGS. 1-5 includes a cuboid housing 3 that is elongated in a feed direction 2 and that has approximately a square cross section and a cuboid stop 4 made from steel that is movable about a damping length 5 against a throttle element 6 of the pallet stopper 1.

Figure 2A:
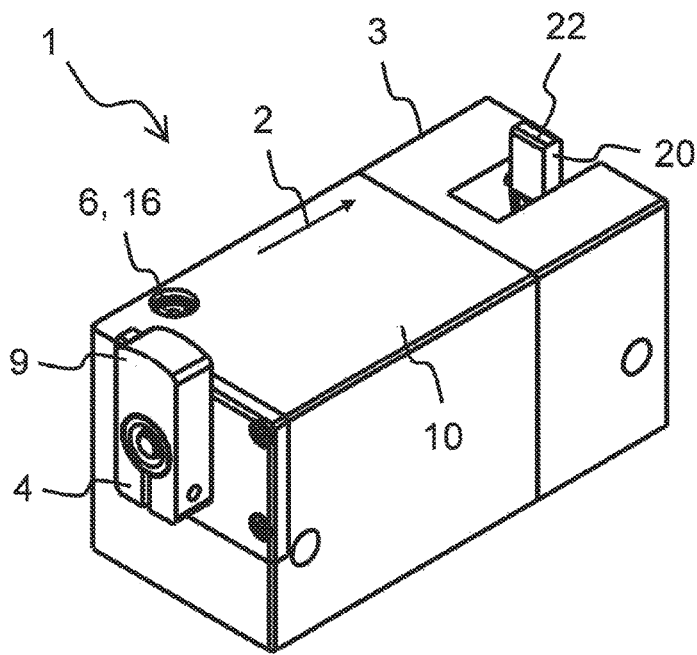
FIG. 2A/B illustrates the first pallet stopper in an end position.
Figure 2B:
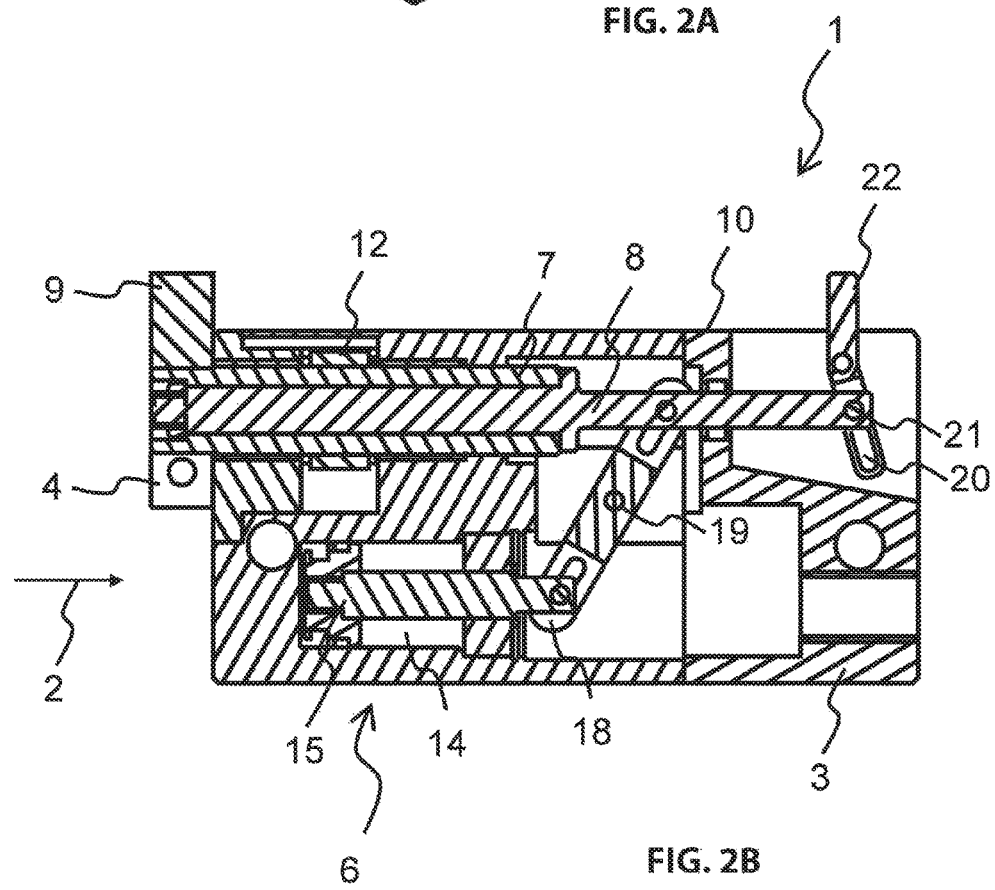
Figure 5:
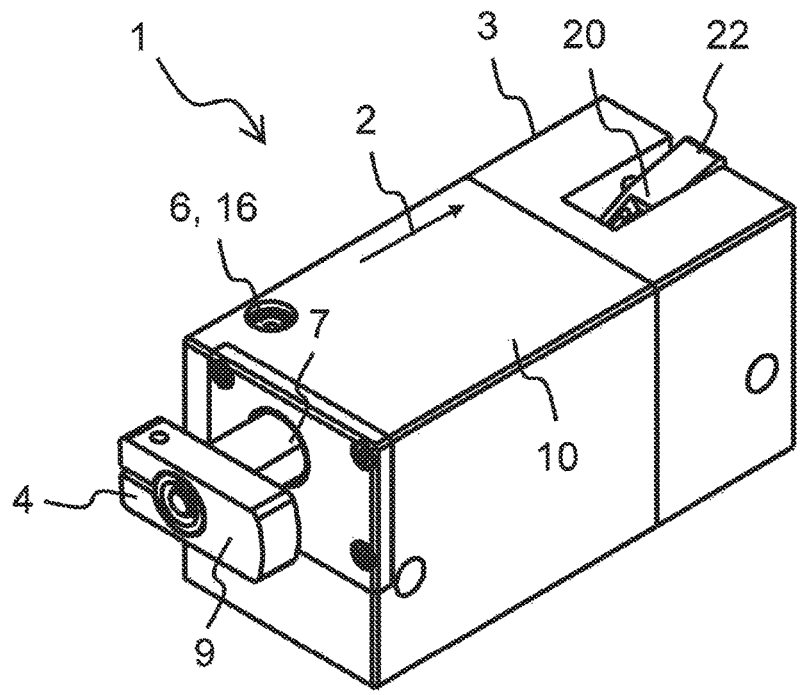
FIG. 5 illustrates the first pallet stopper in the reset position (pallet has run over the slide and has reset the stop)

The stop 4 is clamped onto a tubular stop carrier 7 that is pivotable in the feed direction 2 on a cylindrical stop axle 8 about the feed direction 2 and displaceably supported by the stop axis 8 in the housing 3 in the feed direction 2 about the damping length 5. In the starting position that is illustrated in FIGS. 1A/B and 3A and in the end position that is illustrated in FIGS. 2A/B and 3A the stop head 9 of the stop 4 extends vertically upward beyond a top side 10 of the housing 3.

The pallet stopper 1 includes a motor that is not illustrated in more detail configured as a drive 11 for pivoting the stop 4 wherein the motor engages a gear segment 12 on a stop carrier 7. The stop carrier 7 and thus the stop 4 is pivotable by the drive 11 about a pivot angle 13 of 90° from the end position into an intermediary position that is illustrated in FIGS. 3B and 4 and back from the reset position illustrated in FIGS. 3B and 5 into the starting position.

The throttle element 6 includes an air filled damping cylinder 14 that is arranged parallel to the feed direction 2 under the axis in the housing 3, a piston 15 that is movably supported in the damping cylinder 14 and a check valve 17 that is adjustable by an adjustment screw 16 and arranged in the top side 10 of the housing 3. The piston 15 is connected with a lever 18 that is supported at a lever axis 19 that extends transversal to the feed direction 2 in the housing 3. The lever 18 connects the piston 15 with the stop axis 8 so that both move in opposite directions.

When the stop carrier 7 is inserted into the housing 3 the piston 15 is moved into the damping cylinder 14 and compresses air arranged therein which exits the housing 3 against the check valve 17 and dissipates an impulse of the discrete product that impacts the stop 4 into heat. When the piston 15 moves in an opposite direction the check valve 17 opens and the damping cylinder 14 fills with air again.

The first pallet stopper 1 includes a reset stop 20 made from steel that is coupled with the stop axle 8, The reset stop 20 is supported in the housing 3 about a reset axis 21 that is parallel to the lever axis 19. A reset head 22 of the reset stop 20 is arranged in the housing 3 in the starting position and erects beyond a top side 10 of the housing 3 when the stop carrier 7 moves into the housing 3 against the feed direction 2.

Figure 6:
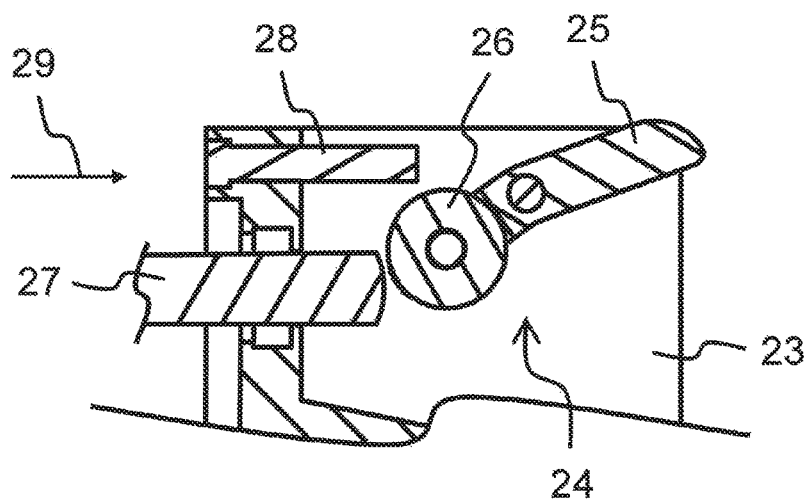
FIG. 6 illustrates a detail of a second pallet stopper according to the invention.

The second pallet stopper 23 according to the invention that is illustrated in FIG. 6 in detail corresponds substantially to the first pallet stopper 1. Different therefrom the reset stop 24 of the second pallet stopper 23 includes a roller 26 that is arranged opposite to the reset head 25 wherein the roller contacts the stop axle 27. The pallet stopper 23 furthermore includes an elastomeric material element 28 which is contacted by the reset head 25 and which defines a movement of the reset stop 24 against the feed direction 29.

Figure 7A:
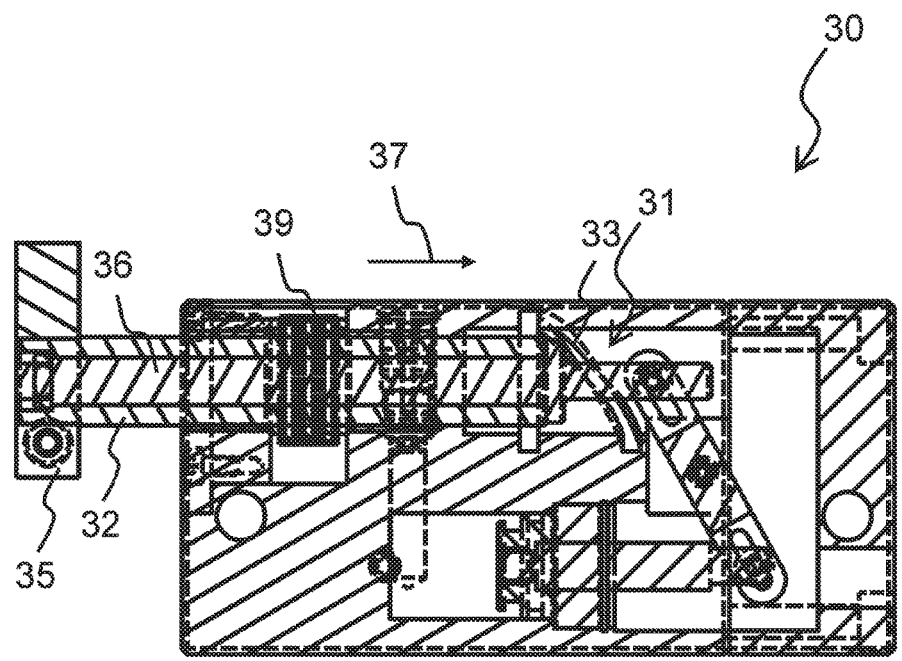
FIG. 7A/B illustrates a third pallet stopper according to the invention.
Figure 7B:
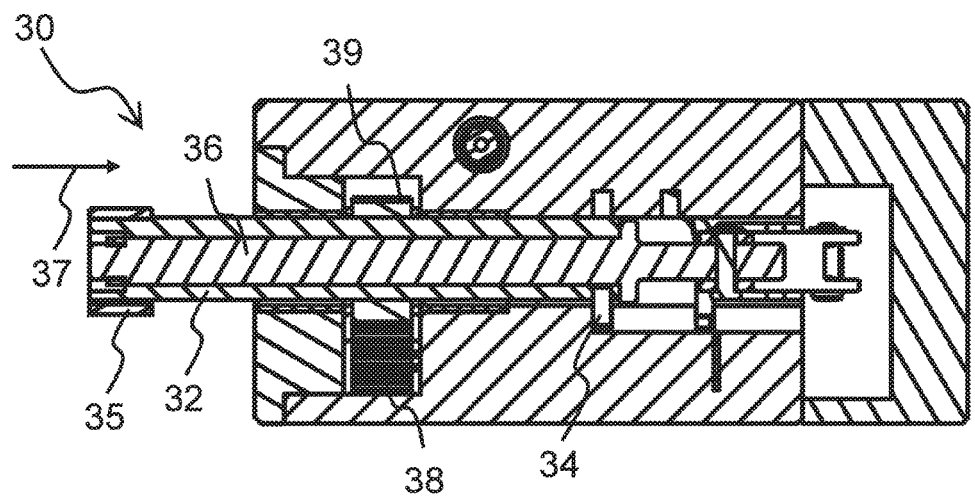

Also the third pallet stopper 30 according to the invention that is illustrated in FIGS. 7A, B is quite similar to the first pallet stopper 1. Instead of a reset stop the third pallet stopper 30 includes a slotted element support with a support groove 30 that envelops the stop carrier 32 like a thread and a support bolt 34 that is attached at the stop carrier 32 wherein the support bolt is supported in the support groove 33.

The pallet stoppers 1, 23, 30 according to the invention are equally suited to stop a discrete product, for example a pallet that is fed by a continuous feed arrangement, for example a conveyor belt along a feed path. The discrete product, the continuous conveying arrangement and the feed path are not illustrated.

The pallet stoppers 1, 23, 30 are installed into the feed arrangement so that the top side 10 of the housing 3 is flush in the feed path and only the stop 4 protrudes into the feed path in the starting positon illustrated in FIGS. 1A/B, 3A and 6 and in the end position illustrated in FIGS. 2A/B the reset stop 20, 24 protrudes into the feed path.

The discrete product contacts the stop 4 and moves the stop 4 in the feed direction 2, 29 from the starting position into the end position illustrated in FIGS. 2A/B. The lever 18 transmits the movement of the stop 4 onto the piston 15 which is displaced accordingly into the cylinder. Thus an impulse of the discrete product is converted into heat and dissipated when the hydraulic oil flows through the piston 15. Simultaneously the movement of the stop 4 is also transmitted to the reset stop 20, 24 which erects into the feed path.

In order to release the discrete product for further transportation the stop 4 is pivoted by the motor about the pivot angle 13 from the feed path into the intermediary positon illustrated in FIGS. 3B and 4 into the housing 3.

When transported further in the feed direction 2, 29 the discrete product runs over the reset stop 20, 24 and in the second pallet stopper 23 according to the invention the reset head 25 and the roller 26, and pivots the reset stop from the feed path into the housing 3. The movement of the reset stop 20, 24 is simultaneously transmitted to the stop 4 which extends against the feed direction 2, 29 from the housing 3 into the reset position illustrated in FIGS. 3B and 5.

In the third pallet stopper 30 the movement of the stop 35 in the stop axis 36 is always directly coupled with a pivot movement of the stop 35 about the stop axis 36. The slotted element support 31 transposes the displacement of the stop 35 from the starting position by the contacting product in the feed direction 37 into a pivot movement about the stop axis 36 into the intermediary position and the pivot movement transmitted by the drive 38 for the reset onto the gear 39 and the stop carrier 32 into a resetting longitudinal movement against the feed direction 37 back into the starting position.

REFERENCE NUMERALS AND DESIGNATIONS 1 pallet stopper
2 feed direction
3 housing
4 stop
5 damping length
6 throttle element
7 stop carrier
8 stop axis
9 stop head
10 top side
11 drive
12 gear segment
13 pivot angle
14 damping cylinder
15 piston
16 adjustment screw
17 check valve
18 lever
19 lever axis
20 reset stop
21 reset axis
22 reset head
23 pallet stopper
24 reset stop
25 reset head
26 roller
27 stop axis
28 elastomeric element
29 feed direction
30 pallet stopper
31 slotted element support
32 stop carrier
33 support groove
34 support bolt
35 stop
36 stop axis
37 feed direction
38 drive
39 gear

What is claimed is:

1. A method for stopping a discrete product that is fed by a continuous conveyor along a feed path in a feed direction to a stop location, the method comprising the steps:

initially moving a stop at the stop location from a reset position outside of the feed path into the feed path so that the discrete product contacts the stop and moves the stop in the feed direction by a damping length wherein an impulse of the discrete product is dissipated by a fluid flowing through a throttle element;

subsequently removing the stop from the feed path and moving the stop by the damping length against the feed direction back into the reset position; and pivoting the stop from the reset position into the feed path and pivoting the stop from the feed path into the reset position about the feed direction.

2. The method according to claim 1, wherein the stop is pivoted in one direction of rotation from the reset position into the feed path and in an opposite direction of rotation from the feed path into the reset position about the feed direction.

3. The method according to claim 2, wherein the stop is pivoted by a pivot angle from the reset position into the feed path.

4. The method according to claim 1, wherein the stop is moved back by the damping length after being removed from the feed path by the discrete product traveling over the stop location.

5. A pallet stopper for stopping a discrete product at stop location of a feed path along which the discrete product is fed by a continuous conveyor in a feed direction, the pallet stopper comprising:

a stop;

a drive by which the stop is movable from a reset position outside of the feed path into the feed path and removable from the feed path;

a throttle element wherein an impulse of the discrete product that impacts the stop and displaces the stop in the feed direction by a damping length is dissipated by a fluid flowing through a throttle element; and a reset drive by which the stop is movable about the damping length against the feed direction back into the reset position, wherein the stop is pivotable by the drive about the feed direction.

6. The pallet stopper according to claim 5, wherein the drive is a motor.

7. The pallet stopper according to claim 5, wherein a damping element includes a piston that is movable in a damping cylinder that is filled with a fluid.

8. The pallet stopper according to claim 7, wherein the piston is mechanically connected with the stop so that the piston is moved against the feed direction when the stop is moved in the feed direction.

9. The pallet stopper according to claim 5, wherein the stop is made from steel.

10. The pallet stopper according to claim 5, wherein the reset drive includes a reset stop that is actuated when the discrete products runs over the stop location.

* * * * *